Figure 1:
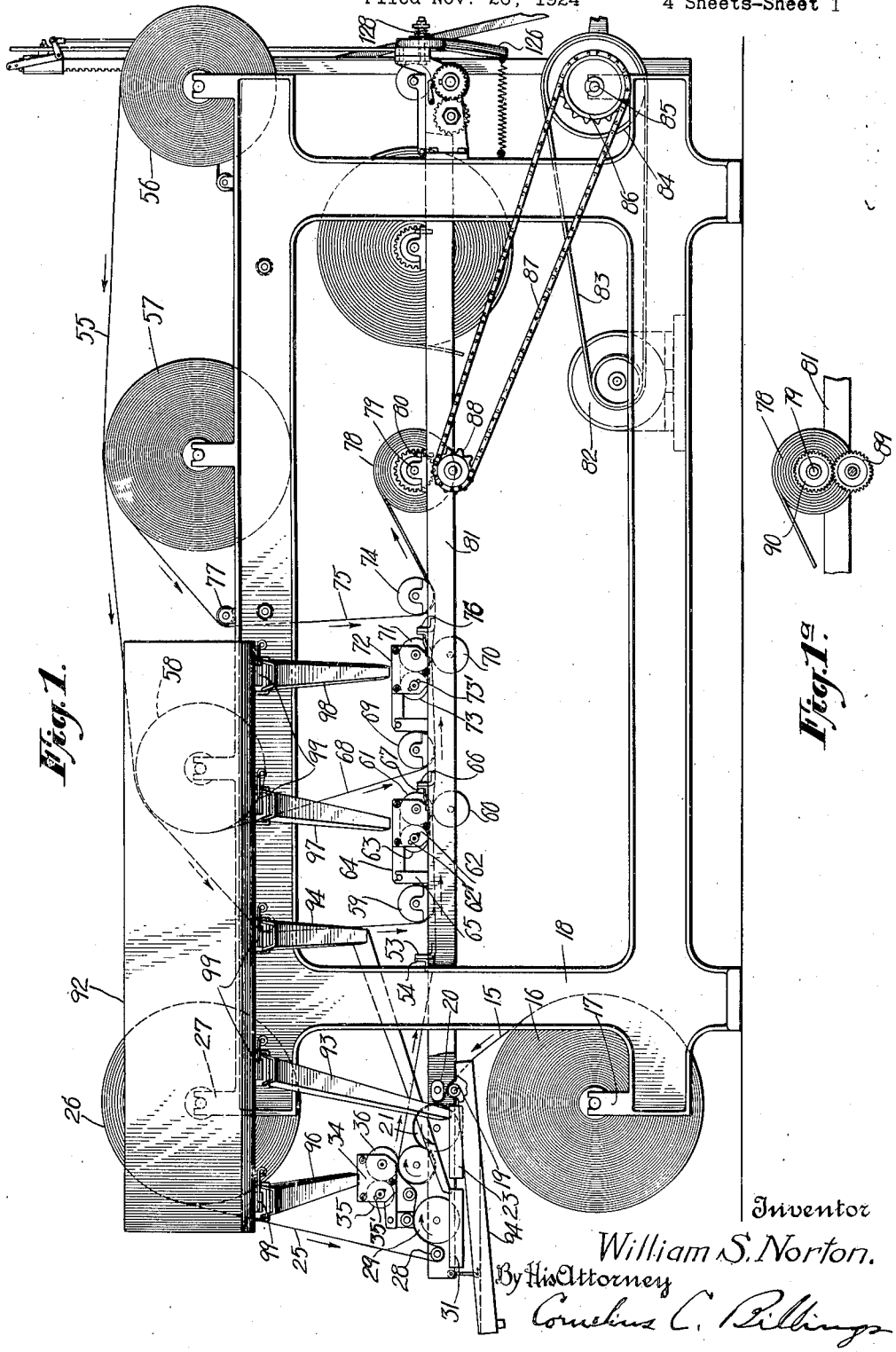

Aug. 31, 1926.
W. S. NORTON
MATRIX FLONG MACHINE
Filed Nov. 26, 1924
1,598,302
4 Sheets-Sheet 1

Fig. 1ª.

Inventor
William S. Norton.
By His Attorney
Cornelius C. Billings

Aug. 31, 1926.  
W. S. NORTON  
MATRIX FLONG MACHINE  
Filed Nov. 26, 1924  
1,598,302  
4 Sheets-Sheet 2
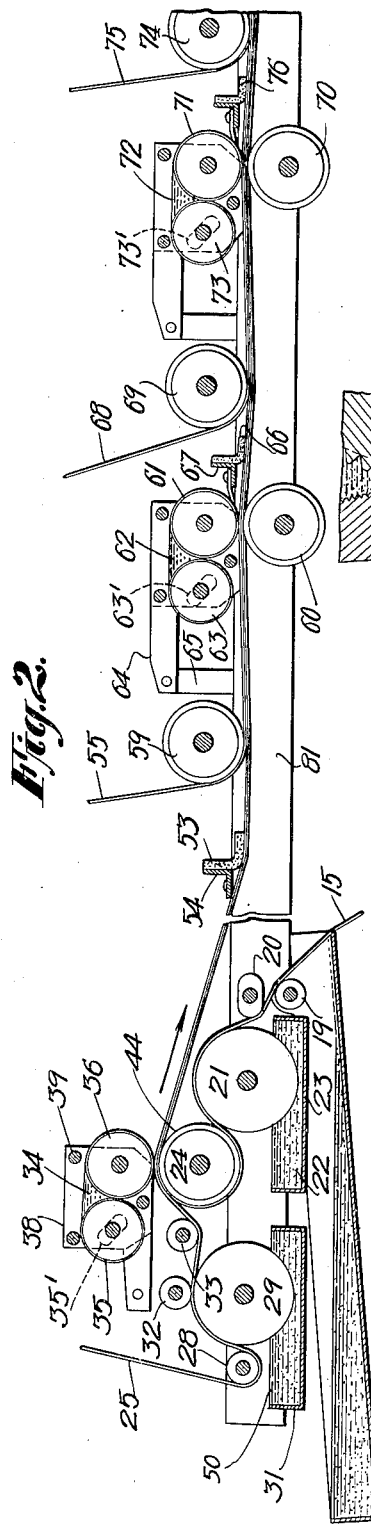
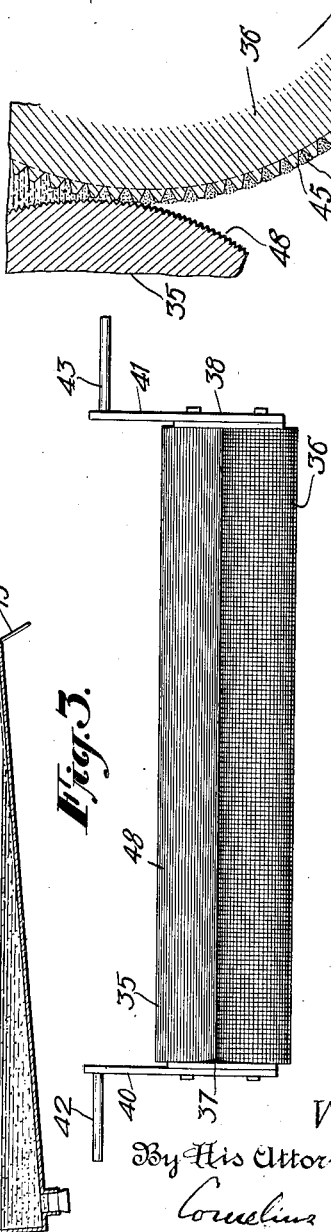
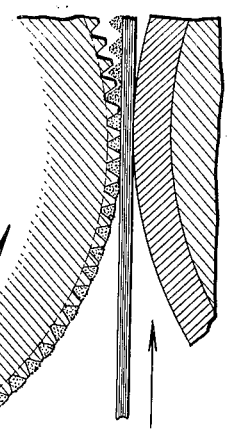
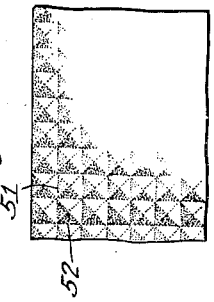
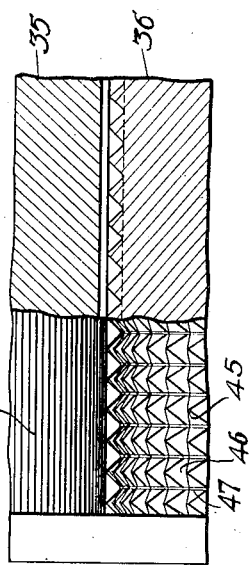
Inventor  
William S. Norton.  
By His Attorney  
Cornelius C. Billings

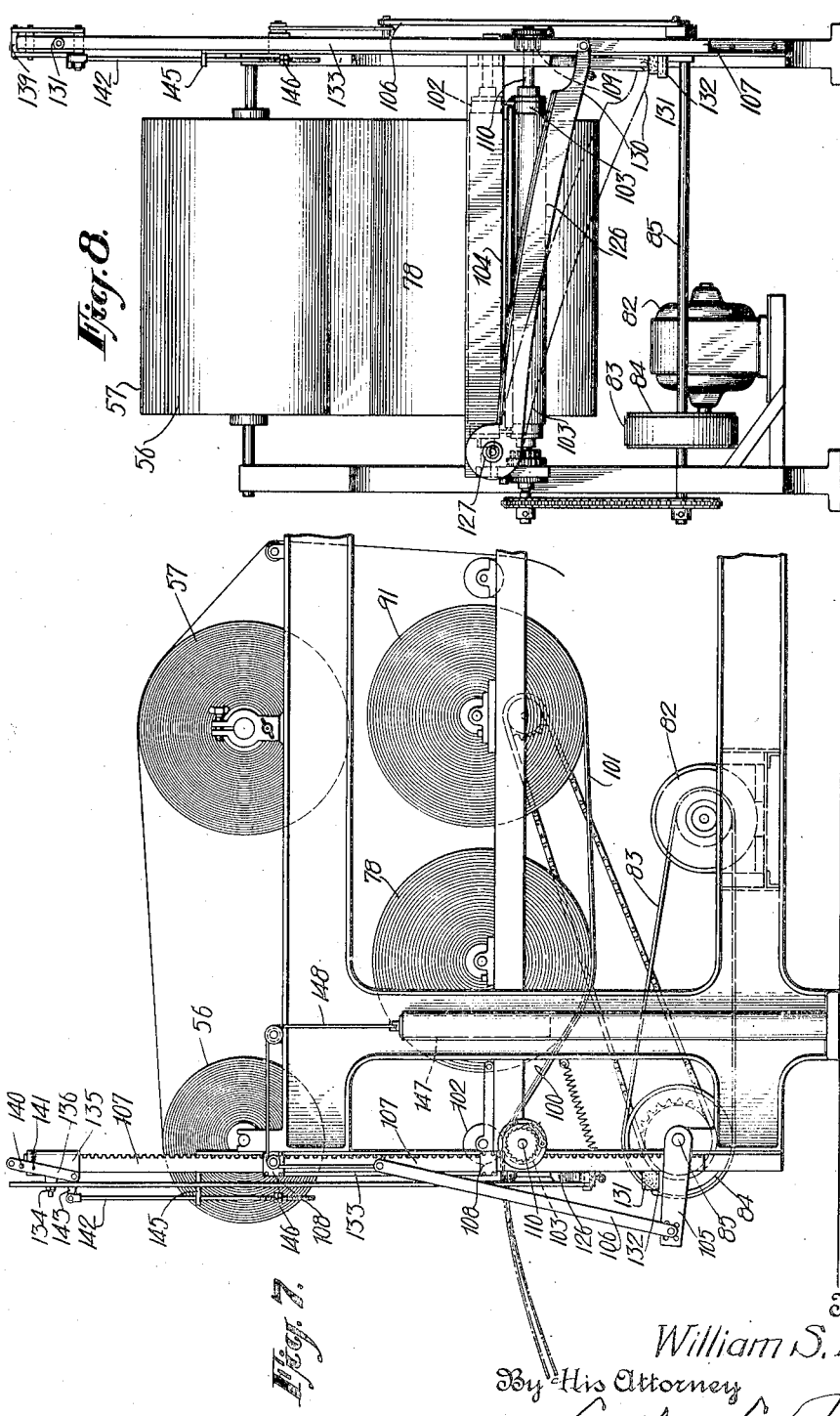

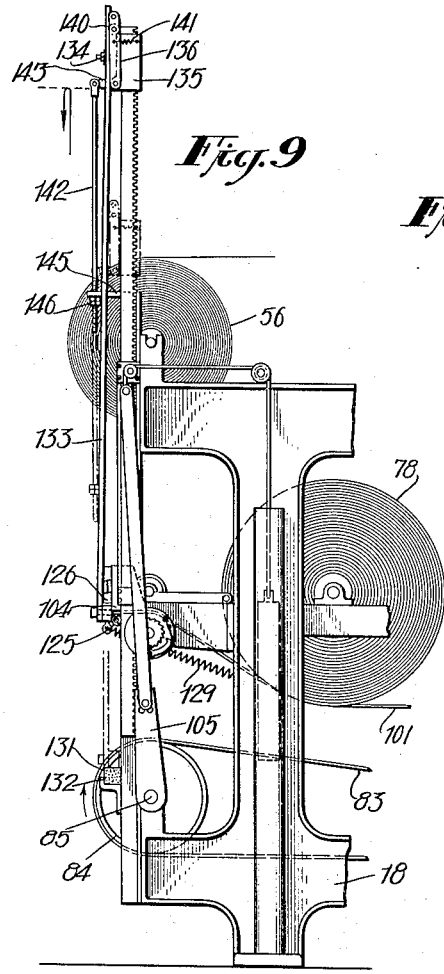

Patented Aug. 31, 1926.

1,598,302

UNITED STATES PATENT OFFICE.

WILLIAM S. NORTON, OF NEW YORK, N. Y., ASSIGNOR TO WHITFIELD PAPER WORKS, OF NEW YORK, N. Y., A CORPORATION OF NEW JERSEY.

MATRIX-FLONG MACHINE.

Application filed November 26, 1924. Serial No. 752,373.

This invention relates to apparatus for making flong, or similar material for use in making type matrices, and particularly to a machine by which paste may be applied efficiently and in proper quantity to the various layers of paper of which the flong is formed.

In making flong, the body or backing of the flong is formed of relatively thick layers of paper and a surface therefor is formed by superposing thereon, successive layers of very thin, fine textured, tissue paper, and causing the several layers to adhere to each other. In forming this surface layer, it is essential to the production of a flong of fine quality, to apply just the right thickness of the adhesion material, hereinafter designated paste, to the tissue paper as it is superposed on the body of the flong, particularly as the tissue paper is so thin that an excess of paste would render it too soft and weak to be handled in the successive operations of making the flong and would thus result in the production of a large quantity of defective product. The application of the proper quantity of paste presents some difficulty as the quantity must be accurately measured and distributed and an excess once applied cannot be removed from the thin tissue.

An object of my present invention is to provide paste distributing and applying rolls for uniformly applying paste in quantities suited to the requirements of the light tissue paper for forming the surface of flong.

Another object of the invention is to provide a machine for making flong in which the various layers of paper may be efficiently superposed and pasted together with a minimum loss or waste of material.

A further object of the invention is to provide a machine for making flong and capable of measuring the product and cutting or dividing it into lengths suitable for drying and further handling.

With these and other objects in view, which will be more clearly and fully apparent from the following description, the invention comprises the apparatus described and set forth in the following specification and claims.

The various features of the invention are illustrated in the accompanying drawings, in which:

Fig. 1 is a side view of a machine for making flong embodying a preferred form of the invention, Fig. 1ᵃ is a side view of a driving gear for rolling up the finished flong, Fig. 2 is a diagrammatic side view of the paste applying and superposing rolls for forming the flong, Fig. 3 is a plan view of the paste applying trough, Fig. 4 is an enlarged view, partly in section, of a portion of the rolls shown in Fig. 3, Fig. 5 is a cross sectional view, on an enlarged scale, of a portion of the paste applying rolls for the tissue paper and of a portion of a supporting and carrying roll for the partly formed flong, Fig. 6 is a view, on an enlarged scale, of the form of paste layer formed on the tissue by the paste applying rolls, Fig. 7 is a side view of an end of the machine, showing rolls of finished flong and mechanism for measuring and cutting the flong into suitable lengths for further handling, Fig. 8 is an end view of the machine taken from the end shown in Fig. 7, the position of a cutting blade in lowered position being indicated in broken lines, Fig. 9 is a side view of a portion of the end of the machine shown in Fig. 7 with the cutting mechanism in a different position from that of Fig. 7, Fig. 10 is a detail side view on an enlarged scale of the cutter operating mechanism, and Fig. 11 is a cross sectional view of the measuring and moving rolls of the machine taken on line 11—11 of Fig. 10.

In my present invention, a pair of sheets of relatively thick paper, to form the body or backing of the flong, are unrolled from a pair of supply rolls, pasted together, and advanced through the machine to a winding roll. As these thicker, coarser, sheets advance through the machine, a layer of paste is applied to one surface and then a layer of very thin, light, tissue paper and then alternate layers of paste and tissue paper are applied to produce the required surface and thickness of the flong. In applying the paste on to which a succeeding layer of tissue paper is laid or superposed, the paste is fed through a trough comprising two differently sized rolls, the surface of the larger of which is provided with longitudinally disposed grooves forming V-shaped ridges and a series of circumferential grooves also forming V-shaped ridges, thus forming a network of receptacles or cavities for the reception of the paste in measured quantities. The smaller roll may have a smooth surface, but I find it desirable, in order to obtain a frictional contact with the larger roll, to roughen the surface of the smaller roll by means of a formation of a series of very fine longitudinal ridges. The smaller roll is resiliently journaled in the sides of the trough so that it may yield in the event that some lump of adhesive material, paper, or foreign matter should engage between the rollers and the machine would still operate without stopping the rotation of the rollers. As the tissue paper is brought into contact with the surface of one roll it receives a layer or deposit of paste of a definite configuration, which, upon being spread out, forms a coating of the requisite thickness, on which a succeeding layer of tissue paper may be laid. Successive sheets of tissue paper are applied in this manner until the desired thickness of surface paper is obtained, usually with three thicknesses of tissue paper, the completed flong being then wound up on a collecting or storing roll. This roll may later be unrolled, measured, and cut to the required sizes.

Referring more particularly to the accompanying drawings, a continuous sheet of paper 15 for forming the lowermost or base layer of the flong is drawn from a supply roll 16, which is supported between brackets 17 mounted on a frame 18 of the machine at the starting end, and is passed between a guide roller 19 and a tensioning bar 20 to a paste applying roll 21. The surface of the paste applying roll 21 is provided with longitudinal corrugations or grooves and dips into a body of paste 22 in a tank 23 so that as the roll is rotated by contact with the paper 15, a layer of paste is carried upwardly and brought into contact with the under surface of the paper. The paper then passes under, and about, a guide roll 24 so that the surface coated with paste is brought uppermost.

Another continuous sheet of paper 25 to be superposed on the sheet 15 is drawn from a roll 26, supported between brackets 27 at the upper part of the frame 18, and passed downwardly under a guide roller 28 and over a paste applying roll 29 of a construction similar to that of the roll 21. The roll 29 dips into a body of paste 30 in a tank 31 and carries a layer of paste upwardly to the under surface of the sheet 25. The sheet 25 then passes beneath a pair of guide rollers 32 and 33 and onto the sheet 15 as it passes over the roll 24, the paste covered surface of the sheet 25 being underneath and being thus brought into contact with the upper, paste covered, surface of the sheet 15, and thus pasting these two sheets together. As the sheets 15 and 25 are of relatively heavy, thick, material, an excess of paste is not objectionable as this excess is readily pressed from the sheets and, because of the thickness of these sheets, is not sufficient to weaken or soften the sheets to any considerable extent.

The sheets 15 and 25, thus pasted together, form the body portion of the flong, on the upper surface of which a surface of thin, fine grained, tissue paper is then pasted. For this purpose, a coating of paste is applied to the upper surface of the sheet 25 of sufficient thickness to cause the first sheet of tissue paper to adhere to the sheet 25 without softening sufficiently to become weak and unworkable. The paste for this coating is supplied from a trough 34 above the sheets 15 and 25, formed of a pair of rolls 35 and 36 and a pair of end plates 37 and 38 held in position to close the space between the rolls 35 and 36 by means of longitudinal rods 39. The trough is anchored in position to enable it to rise and fall, by means of a pair of arms 40 and 41 pivotally anchored at their ends by means of outwardly projecting pins 42 and 43 extending into suitable sockets in the frame 18, and is supported on the roll 24, on which the roll 36 rests and, from which it is separated by the sheets 15 and 25. The roll 24 is preferably provided with a plain surface 44, and, as the sheets 15—25 pass over the roll 24, they rotate the roll 36 and draw a film or layer of paste downwardly between the rolls 35 and 36 and onto the upper surface of the sheet 25.

The surface of the roll 36 is such that it carries through the juncture of the rolls 35 and 36 an accurately measured and distributed quantity of paste to attach the tissue paper forming the first layer of the finishing surface of the sheet 25, and deposits and distributes this paste uniformly on the area of the sheet 25. For this purpose the surface of the roll 36 is corrugated to form longitudinal V-shaped ridges 45 and grooves 46 extending lengthwise of the roll and intersected at short intervals by circumferential V-shaped grooves 47, thus forming short open ended troughs throughout the surface of the roll. The roll 35 may be plain but I found it desirable to also provide it with longitudinal grooves 48 finely made to form a roughened surface for frictional engagement with the surface of the roll 36. The two rolls thus seal the bottom of the trough 34 against the escape of any paste when the rollers are not rotating. As the rolls rotate to carry the surfaces of the rolls away from the line of juncture, each of the grooves in the larger roll carries a filling of paste which is thus brought into contact with the surface of the sheet 25 passing over the supporting roll 24. When the roll comes into contact with the surface of the sheet 25 it deposits thereon a "network" of paste as indicated in Fig. 6.

The smaller rolls 35, 63, and 73 are journaled in diagonally disposed slots 35', 63' and 73', respectively, so as to provide a resilient journal for the purpose of enabling any lump of paste or paper, or foreign material, to pass between the rollers without stopping their rotation. By a suitable proportioning of the areas of the grooves and ridges the quantity of paste carried to and deposited on the surface 25 may be adjusted to suit the properties and qualities of the tissue paper to be laid on the surface. A uniform distribution of the paste is also guaranteed in this manner as owing to the breaking up of the layer of paste there is no tendency for paste to flow or to be drawn to local spots.

As the sheets of paper 15—25 pass from the roll 36 the surface coated with paste being uppermost, they pass beneath a wiper 53 of flexible material supported crosswise of the sheets by means of a cross beam 54 and pressing downwardly on the paste covered surface of the sheet 25 to spread the paste over the uncovered or bare spots 51 and 52 and thus present a smooth, uniformly coated surface for the reception of the first layer of tissue paper to form the surface of the flong. A continuous sheet 55 of tissue paper for this purpose is supplied from a supply roll 56 supported between brackets at the upper opposite end of the frame 18, from which the sheet is drawn over rolls 57 and 58 of tissue paper, for subsequent layers, thence downwardly about a guide roller and then under a guide roll 59 under which the sheet 15—25 is drawn tautly to press the tissue paper onto the paste covered surface of the upper sheet 25.

The lower surfaces of the guide rollers 59, 69 and 74 are each disposed slightly below the imaginary straight line formed by the paper in order to effect the proper pressure for contact between the several sheets of paper. The paper 55 is thus pasted on, and closely secured to, the sheet 25 and forms a new surface on which a new layer of paste and an additional sheet of tissue paper may be deposited.

In pasting on an additional sheet of tissue paper, the sheet 15—25 passes between a lower, supporting roll 60, similar to the roll 24 and an upper, paste applying roll 61 supported on the roll 60 and forming a part of a paste trough 62. The trough 62 is similar in form and function to the trough 34, being formed of the roll 61, the surface of which is suitably grooved and ridged, and a complementary ridged and grooved roll 63 and closed at its ends by end plates having arms 14 secured to brackets 65 on the frame 18. In passing between the rolls 60 and 61 a network of paste such as shown in Fig. 6 is applied to the upper surface of the tissue paper on the sheet 25 and is thereupon drawn under a spreading wiper 66 on a transverse beam 67 to form a smooth coating of paste for receiving a subsequent sheet of tissue paper. A second continuous sheet 68 of tissue paper is drawn from the supply roll 58 downwardly under a roll 69 under which the sheet 15—25 is also tautly drawn to press the freshly coated surface of paste into close contact with the tissue paper.

To apply a final sheet of tissue paper, the sheet 15—25 passes between a supporting roll 70 and paste applying roll 71 of a third paste applying trough 72 of a construction similar to the troughs 34 and 62 and thence under a transverse spreading wiper 76 and pressing roll 74. A sheet of tissue paper 75 is drawn from the supply roll 57 about a guide roller 77 and under the roll 74 to press it into close contact with the freshly coated surface of the sheet 15—25 and thus form the finished surface of the flong. The flong is then wound onto a storage roll 78 on a shaft 79 journaled in a pair of bearings 80 mounted on longitudinal beams 81 on which the various paste applying rolls are also mounted. The shaft 79 is rotated to wind the flong on the roll from a motor 82 or other source of power, through a belt 83, pulley 84, a supporting shaft 85 for the pulley, a cog wheel 86 on the shaft 85, and a chain 87 driving a second cog wheel 88, to which is secured a pinion 89 meshing with and driving a pinion 90 rigidly mounted on the shaft 79. When one roll 78 is completed, its bearings 80 are slid on the beams 81 and it is stored while a second roll 91 is being built up.

The paste for the various rolls may be supplied in any suitable manner to the various feeding tanks and troughs. For convenience, however, it is preferable to supply the paste from a common supply tank 92 mounted in the upper part of the frame 18 from which a quantity of the paste may be fed to the tanks 23 and 31 through spouts 93 and 94, respectively. A constant level of paste may be maintained in the tanks 23 and 31 by permitting the paste to overflow into a trough 94, from which it may be returned to the supply tank 92. Similarly, the troughs 34, 62 and 72 may be supplied through troughs 96, 97, and 98, respectively. The flow of paste into the various spouts may be controlled by means of valve 99.

When sufficient flong has been formed and rolled up, preferably in two rolls 78 and 91, which are then in about the positions shown in Fig. 7, the flong is unwound from these rolls and passed through a measuring and cutting mechanism in which it is cut up into sheets of the desired size. For this operation, sheets of flong 100 and 101 from the rolls 78 and 91, respectively, are passed between an upper roll 102 and a lower roll 103, which is driven intermittently to alternately advance a length of flong of the desired length therethrough and under a fixed knife edge 104 and to then stop and hold the flong while this length is being severed.

The lower, driving, roll 103 is for this purpose, intermittently driven from the shaft 85 by means of a crank arm 105 rigidly mounted on the end of the shaft and at its free end connected by means of a link 106 to reciprocate a vertical rack 107, guided in guide brackets 108 on the end of the frame 18, which in its downward movement drives the roll 103 through a suitable transmission mechanism, and in its upward movement permits the transmission mechanism and roll 103 to remain stationary. For this purpose, the rack 107 meshes with and drives a pinion 109 loosely mounted on a shaft 110 extending transversely of the frame 18 of the machine. Rigidly secured to the face of the pinion 109 by means of a screw 111 is a plate 112 having a pawl 113 resiliently pressed by means of a leaf spring 114 into engagement with the teeth of a ratchet wheel 115 keyed onto the shaft 110. The arrangement of the pawl 113 and ratchet 115 is such that, as the rack 107 moves upwardly and the pinion 109 and plate 112 rotate in a clockwise direction, the pawl 113 slips over the teeth of the ratchet 115 and, as the rack 107 descends and the pinion 109 and plate 112 rotate in counter clockwise direction, the pawl 113 engages the teeth of the ratchet 115 and rotates it and the shaft 110, on which it is mounted, counter clockwise.

The rotation of the shaft 110 is transmitted from a gear 116, Fig. 11, keyed onto the shaft 110 at its opposite end, to a gear 117 meshing with the gear 116 and keyed to a collar 118 rotatably mounted on a stub shaft or bolt 119 mounted in one of the series of holes 120 in the frame 18. Also keyed on the collar 118 is a gear 121 which in turn meshes with and drives a gear 122, which is keyed to a shoulder 123 extending from the end of the roll 103, which is rotatably mounted on the shaft 110. The train of gears 116—122 is such that the roll 103 is given sufficient rotation upon the downward movement of the rack 107 to advance the desired length of flong through the rolls. The rotation of the rolls may be adjusted to advance any desired length of flong upon the movement of the rack 106 through a definite distance, by changing the sizes of the gears 117 and 121, the holes 120 being at various distances from the axis of the shaft 110 to enable gears of different diameters to be mounted in the train.

The surface of the roll 103 may be covered with a resilient layer 124 to enable it to more effectively grip the surface of the flong to be advanced. The advancing sheets of flong are guided and supported by means of a roller 125 and held against the under edge of the fixed knife edge 104 in position to be severed by the upward movement against the knife edge 104 of a movable knife blade 126.

The knife blade 126 is pivoted at 127 at one end to an end of the fixed knife edge 104 and held tightly thereagainst by means of a spring 128, Fig. 1, at the end 127 and a tension spring 129 at the opposite end. During the advance of a length of flong through the rolls 102 and 103, the knife blade 126 hangs downwardly with its lower end 130 resting on a resilient pad 131 supported in a bracket 132 at the end of the frame 18.

As the rack 107 moves upwardly, the blade 126 is swung upwardly on the pivoted end 127 by means of a vertically slidable rod 133 connected at its lower end to the end 130 of the blade 126 and at its upper end connected by means of a clamping nut 134 to a collar 135 encircling the upper end of the rack 106. During the upward movement of the rack 106 the collar 135 is supported from the top of the rack by means of a pair of arms 136, which are mounted at their lower ends on a rock shaft 137 journaled in the lower end of the collar 135, and are spaced at their upper ends by a spacing collar and bolt 139 and carrying between them a roller 140 which rides over the end of the rack 107.

During the major portion of the upward movement of the rack 107, the arms 136 are held tilted towards the rack by means of a tension spring 141 to hold the roller 140 over the top of the rack and thus hold the collar 135 in position on the upper end of the rack, and cause the rod 133 and blade 126 to rise. As the blade 126 is held to slide tightly against the knife blade 104, the sheets 100 and 101 projecting past the knife blade 104 are severed. When the rack approaches the upper limit of its movement, the arms 136 are swung away from the rack until the roller 140 is free of the end of the rack and the collar 135, rod 133 and blade 126 are permitted to fall until the end of the blade rests on the pad 131 leaving the space under the blade 104 clear for the passage of a succeeding length of flong.

This tilting of the rock shaft 137 and arms 136 is actuated by a rod 142 suspended from the outer end of an arm 143 rigidly mounted on the rock shaft 137 and depending through an eyelet in a bracket 145 projecting from the end of the frame 18. During the upward movement of the rack 106 and collar 135 the rod 142 is drawn upwardly through the eyelet until a nut 146 on the rod is brought up against the lower face of the bracket 145 and further upward movement of the rod is thus prevented. As the rack 106 continues to move upwardly, the outer end of the arm 143 being held at a fixed altitude causes the rock shaft 137 to tilt and swing the arms 136 and roller 140 free of the top of the rack bar 106 and permits the collar 135 to fall. The collar remains in its lower position during the downward movement of the rack bar 107, which carries the upper end of the rack bar below the roller 140, which is then drawn into position over the end of the rack by means of the spring 141 and is in position to be lifted by the next upward movement of the rack bar.

The positions to which the knife may be lifted may be adjusted by adjusting the rod 133 in the clamping nut 134 on the collar 135, and the height at which the collar 135 is released from the top of the rack 107 may be adjusted by adjusting the position of the nut 146 on the rod 142. For this purpose, the rod 142 is threaded in its lower portion and, to prevent accidental turning of the nut 146, a lock nut is provided to lock it in position.

The weight of the rack 107 may be balanced by means of a compensating weight 147 suspended from a cord 148 extending over pulleys 149 and connected at one end to the weight 147 and at the other end to the rack 107.

Through the above invention, therefore, a machine is provided which enables paste to be accurately and uniformly applied to a surface of flong so that tissue paper of the lightest and finest structure may be placed thereon and pasted to the flong without danger of weakening or injury and provides means whereby the paper may be smoothly and rapidly placed on the fresh paste. The invention also provides a unitary machine by which the various sheets of paper of which the flong is formed may be pasted together and then measured and cut to size without excessive handling.

It is recommended that the "paste" to be used in the above described operation be one of the standard sterotypers' pastes commonly used by them for the making of flong, the constituency of which is well known in the art.

As changes of construction could be made within the scope of my invention, it is intended that all matter contained in the above description or shown in the accompanying drawings shall be interpreted as illustrative and not in a limiting sense.

Having described my invention, what I claim and desire to secure by Letters Patent is:

1. In an apparatus of the type described, a trough consisting of a paste applying roll having grooves extending in a longitudinal direction on its surface and circumferential grooves intersecting said longitudinal grooves, and a co-operating surface for said roll.

2. In an apparatus of the type described, a trough consisting of a pair of rolls for the spreading and application of paste, one of said rolls having lengthwise corrugations on its surface and also circumferential grooves thereon, the other roll frictionally engaging the first mentoned roll.

3. In an apparatus of the type described, a trough consisting of a pair of rolls for the spreading and application of paste, one of said rolls having lengthwise corrugations on its surface and also circumferential grooves thereon, the other roll frictionally engaging the first mentioned roll and provided with a fine roughened surface.

4. In an apparatus of the type described, a trough consisting of a roll having circumferential grooves and raised, longitudinally grooved portions between said circumferential grooves, and a second roll contacting with the ridges on the surface of the first mentioned roll.

5. In an apparatus of the type described, a trough consisting of a roll having circumferential grooves and raised, longitudinally grooved portions between said circumferential grooves, and a second roll contacting by gravity with the ridges on the surface of the first mentioned roll.

6. An apparatus of the type described which comprises a paste trough, a pair of rolls forming the bottom of said trough, one of said rolls having a longitudinally grooved surface intersected by circumferential grooves, the other mounted to gravitate in contact with the first mentioned roll and resiliently journaled.

7. In an apparatus of the type described, a paste trough consisting of a pair of closely contacting rolls and side plates, one of said rolls being fixedly journalled in said plates and the other resiliently journaled therein.

8. In an apparatus of the type described which comprises, a movable paste trough consisting of a pair of said plates and a pair of rolls forming the bottom of said trough, one of said rolls having longitudinally and circumferentially disposed grooves on its surface and fixedly journaled in the side plates, the other roll contacting with the first mentioned roll and resiliently journaled in the side plates.

9. In an apparatus of the type described, a movable paste trough having an outlet in its lower portion, a pair of rolls normally closing said outlet, one of said rolls having longitudinally extending grooves in its surface and also circumferential grooves intersecting said longitudinal grooves, the other roll of the pair contacting with the first mentioned roll, and a supporting roll on which the grooved roll rests.

WILLIAM S. NORTON.